United States Patent Office 3,812,163
Patented May 21, 1974

---

3,812,163
METHOD FOR THE PREVENTION OF THE FORMATION OF SOLID RESIDUES ON THERMAL TREATMENT OF FUFURAL OR FURFURAL-EXTRACT MIXTURES
Ulrich Lohmüller, Salzbergen, Germany, assignor to Wintershall Aktiengesellschaft, Kassel, Germany
No Drawing. Filed Dec. 22, 1971, Ser. No. 211,036
Int. Cl. C07d 5/22
U.S. Cl. 260—347.9                    2 Claims

ABSTRACT OF THE DISCLOSURE

The formation of solid residues during thermal treatment of furfural or furfural-extract mixtures is prevented by passing the furfural or furfural-extract mixtures at a temperature of 120 to 220° C. through a layer of porous coarse-grained gas coke, the grains having a diameter of 3 to 10 cm, using a charge of 0.1 to 10 volumes of furfural or furfural-extract mixture per volume of porous gas coke layer.

BACKGROUND OF THE INVENTION

With the employment of furfural in thermic processes, technical difficulties arise due to the formation of solid residues.

On employing furfural as a selective solvent solid residues separate themselves during the recovery process in the evaporators. The idle time of the apparatus is thus considerably increased, and consequently the economy of employing furfural as a selective solvent is diminished.

The solid residues comprise hydrocarbons and the carbon-hydrogen ratio within the layer which is deposited on the heat transmitting surface, constantly increases from the medium side to the heat-transmitting surface. The outermost layer comprises pure carbon, and the inner layers of the residue comprise humic acid which is insoluble in furfural but soluble in ethyl alcohol saturated with sodium hydroxide, the solubility of the solid residues within the residue layer however reducing from the inside towards the outside.

In order to avoid or reduce conversion of the furfural by oxidation it is known to add thereto oxygen-binding inhibitors such as diphenylamine, anthracene, hydroquinone, phenol, white phosphorus or antimony halides.

SUMMARY OF THE INVENTION

A method has now been found for the prevention of the formation of solid residues during thermal treatment of furfural or furfural-extract mixtures, wherein a furfural or furfural-extract mixture, exposed to a temperature of from 120° to 220° C., is passed through a layer of porous coarse-grained gas coke with grains having a diameter of 3 to 10 cm., said layer acting as a crystallizer for the residue-forming materials, and wherein the charge amounts to 0.1 to 10 volumes furfural or furfural-extract mixture per volume of the porous gas coke layer per hour and subsequently the thus-treated furfural or furfural-extract mixture is again fed back.

The process can also be operated in such a manner that a partial flow of substantially 5–20% by volume and preferably 8–12% by volume of furfural or furfural-extract mixture, exposed to a temperature of from 120° to 220° C., is continuously drawn off and after passing through the porous gas coke layer, is returned to the main stream.

The furfural or furfural-extract mixture, which on heat treatment, are inclined to produce a solid residue, have the initial products removed from same by the method of the invention so that the hindrance of heat transmission thorugh the formation of a heat-isolating solid layer is avoided, and due to this the previously necessary idle time of an apparatus (system) for removing the residues is practically dispensed with and a considerable increase in the utilization of the system capacity is achieved.

The method according to the invention has the advantage over the known use of oxygen-binding inhibitors of eliminating the constant addition of foreign materials which accumulate uncontrolled either in the furfural, in the refined product or in the extract and which adversely influence the degree of purity of said materials, and that the expensive dosage devices for the inhibitors can be dispensed with.

DESCRIPTION OF THE PREFERRED EMBODIMENTS

Example 1

6 m.$^3$ furfural was distilled for 1,000 hours at the rate of around 3 m.$^3$ of furfural/h. in an apparatus made of iron, the kettle of which had a diameter of substantially 2 m. and a height of substantially 2.50 m., and which was filled with about 1.25 m.$^3$ of coarse-grained gas coke, the individual pieces of which had a diameter from 4–6 cm. and where the vapors were condensed and the condensate continuously returned to the kettle. In addition, 10–20 m.$^3$ air/h. was forced into the kettle sump to promote oxidation. After 1,000 hours of distillation time the kettle was opened and it was unexpectedly found that the total amount of furfural was undecomposed and without any kind of solid residues. The gas coke contained only minute amounts of humic acids.

Comparison example

In the above described apparatus 6 m.$^3$ of furfural was distilled in one hour, condensed and the condensate was continuously returned to the kettle. Furthermore, 10–20 m.$^3$ air/h. was forced into the kettle sump for furthering the oxidation. After 190 hours the distillation had to be discontinued as almost the whole amount of furfural had been converted into a coke-like mass in the kettle. This solid residue was divided into an upper layer (interface residue-furfural), a middle layer and a lower layer (interface residue-heat surface). From each layer 1 g. was suspended in ethanolic caustic soda solution, heated for ten minutes at the return flow cooler to the boiling temperature, then filtered and by weighing the insoluble residue, the solubility of the three layers was determined; 48% by weight of the upper layer, 39% by weight of the middle layer and 30% by weight of the lower layer were soluble. Through acidification, crystallized humic acids were isolated from the three filtrates.

Example 2

In the apparatus described in Example 1, 5 m.$^3$ of furfural/h. was distilled, the vapors condensed and the condensate returned to the kettle. For furthering oxidation, 10–15 m.$^3$ air/h. was constantly blasted in whilst a pump constantly removed around 0.5 m.$^3$/h. (=10% by volume) of the total furfural from the kettal sump and this partial amount, having a temperature of from 160° to 165° C., was forced from below to the top through a cylinder which was filled with gas coke pieces having a diameter of 6–10 cm., and had an inside diameter of 1.4 m. and a height of 2 m. The gas coke filling amounted to 3 m.$^3$. The charge amounted to 0.166 m.$^2$ of furfural per m.$^3$ gas coke/hour.

Without circulation pumping of the partial amount of furfural through the gas coke, distillation was discontinued after 48 hours due to the clearly recognizable commencing of carbonization of the furfural in the kettal. With circulation pumping through the gas coke no solid residue could be detected in the kettle after 90 hours. The amount of furfural had hardly changed.

Example 3

The process of Example 2 was carried out except that 0.5 m.³ of an extract was added to the furfural in the kettal sump. The extract, which resulted from the selective refining of vacuum distillates with furfural had the following properties:

| | |
|---|---|
| Specific weight, g./m.³ | 1.001 |
| Index of refraction at 20° C. | 1.5662 |
| Viscosity E/50° C. | 103.7 |
| Relative molecular mass | 400 |
| Color | green/black |
| Statistical C-distribution, percent: | |
| $C_A$ | 37 |
| $C_N$ | 29 |
| $C_P$ | 34 |

The same result as described in Example 2 was obtained.

What is claimed is:

1. A method for the prevention of the formation of solid residues in furfural or a furfural-extract mixture being subjected to a thermal process which comprises drawing off the furfural or furfural-extract mixture and passing the withdrawn material at a temperature of from 120° to 220° C., through a layer of porous coarse-grained gas coke acting as a crystallizer for the residue-forming materials, the individual grains of said coke having a diameter of 3 to 10 cm., the charge being 0.1 to 10 parts of furfural or furfural-extract mixture by volume per one part by volume of the porous coke layer per hour and subsequently recycling the thus treated furfural or furfural-extract mixture to the thermal process.

2. A method according to claim 1, wherein about 5 to 20% by volume of furfural or furfural-extract mixture, is continuously drawn off and recycled to the thermal process after passing through the porous gas coke layer.

References Cited

UNITED STATES PATENTS

| | | | |
|---|---|---|---|
| 2,470,339 | 5/1949 | Claussen et al. | 260—674 X |
| 2,485,070 | 10/1949 | Schulze et al. | 260—347.9 X |

OTHER REFERENCES

Khol'Kin et al.: Chemical Abstracts (1964), vol. 60, 13440e.

JOHN D. RANDOLPH, Primary Examiner

B. DENTZ, Assistant Examiner

U.S. Cl. X.R.

208—48, 327